United States Patent [19]

Solano

[11] Patent Number: 5,271,975

[45] Date of Patent: Dec. 21, 1993

[54] HEAT RECOVERABLE TUBULAR ARTICLE

[75] Inventor: David W. Solano, Troy, Mich.

[73] Assignee: Raychem Corporation, Menlo Park, Calif.

[21] Appl. No.: 843,668

[22] Filed: Feb. 28, 1992

[51] Int. Cl.$^5$ ............................................. H01R 4/16
[52] U.S. Cl. ................................... 428/34.9; 428/35.1;
174/74 A; 174/74 R; 174/93; 174/DIG. 8;
439/874; 439/932
[58] Field of Search ............ 174/DIG. 8, 74 A, 74 R,
174/93; 428/34.9, 35.1; 439/874, 932

[56] References Cited

U.S. PATENT DOCUMENTS

| | | | |
|---|---|---|---|
| 3,045,102 | 7/1962 | Fessenden | 174/75 R |
| 3,205,467 | 9/1965 | Ganci | 174/DIG. 8 |
| 3,323,200 | 6/1967 | McKeon | 174/DIG. 8 |
| 3,559,766 | 2/1971 | Heslop | 185/39 |
| 4,110,396 | 8/1978 | Reynolds | 264/236 |
| 4,195,902 | 4/1980 | Caveney et al. | 439/932 |
| 4,206,786 | 6/1980 | Wetmore | 138/178 |
| 4,221,457 | 9/1980 | Allen et al. | 439/874 |
| 4,289,553 | 9/1981 | Nolf | 9/1981 |
| 4,350,183 | 9/1982 | Holmes | 9/1982 |
| 4,789,164 | 12/1988 | Winter et al. | 12/1988 |
| 4,801,279 | 1/1989 | Nakanashi | 174/DIG. 8 |
| 4,935,068 | 6/1990 | Duerig | 148/563 |
| 4,995,822 | 2/1991 | Borden et al. | 439/932 |

FOREIGN PATENT DOCUMENTS

| | | |
|---|---|---|
| 0424090 | 4/1991 | European Pat. Off. |
| 1098304 | 1/1968 | United Kingdom |
| 1245119 | 9/1971 | United Kingdom |
| 1428134 | 3/1976 | United Kingdom |
| 2125237 | 2/1984 | United Kingdom |
| 2229958 | 10/1990 | United Kingdom |

Primary Examiner—Ellis P. Robinson
Assistant Examiner—Rena L. Dye
Attorney, Agent, or Firm—Herbert G. Burkard; Sheri M. Novack

[57] ABSTRACT

A heat recoverable article comprises a tube of polymeric material and a spring. The spring has a first bent configuration in which it is bent at a specific angle and a second configuration in which it is relatively straight, the spring being held in its first configuration by the tube. When the article is heated the polymeric material of the tube softens thereby permitting the spring to recover toward its bent configuration. The spring can be selected such that it recovers with sufficient force to bent a substrate over with the tubular recoverable article is positioned.

15 Claims, 4 Drawing Sheets

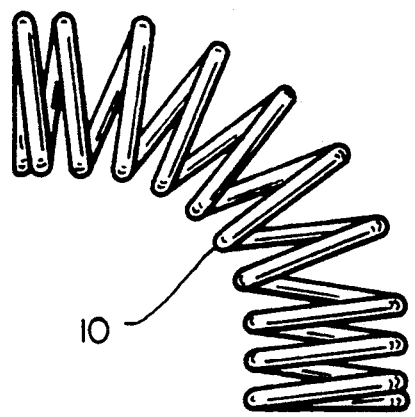
FIG_1
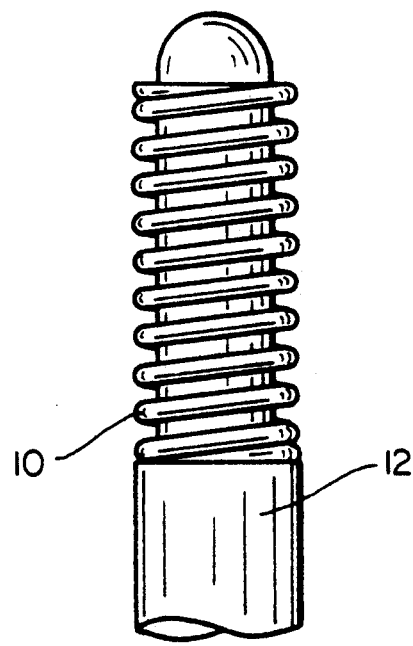
FIG_2

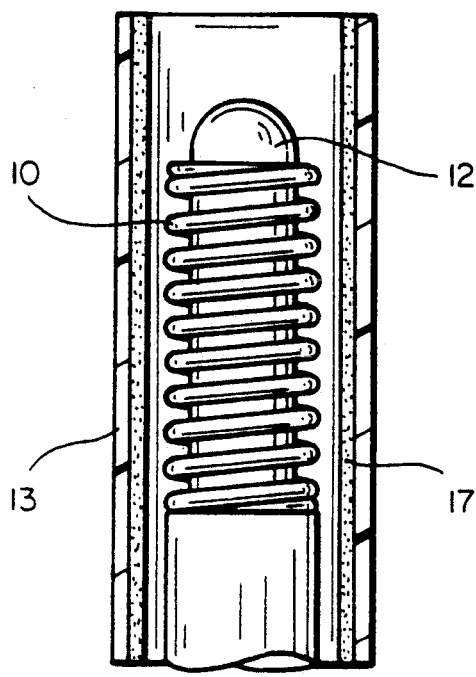
FIG_3
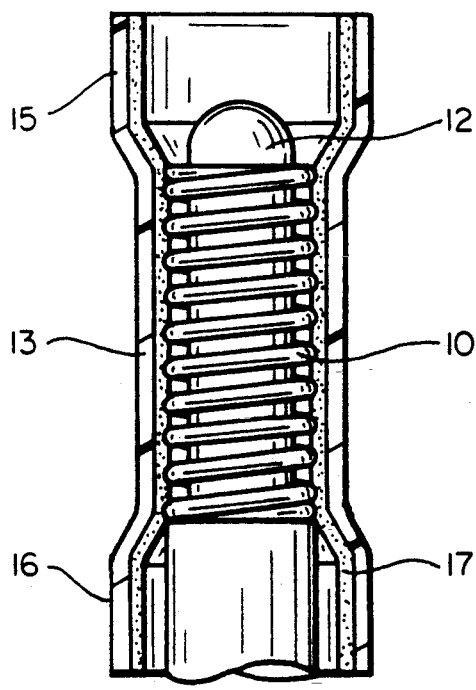
FIG_4

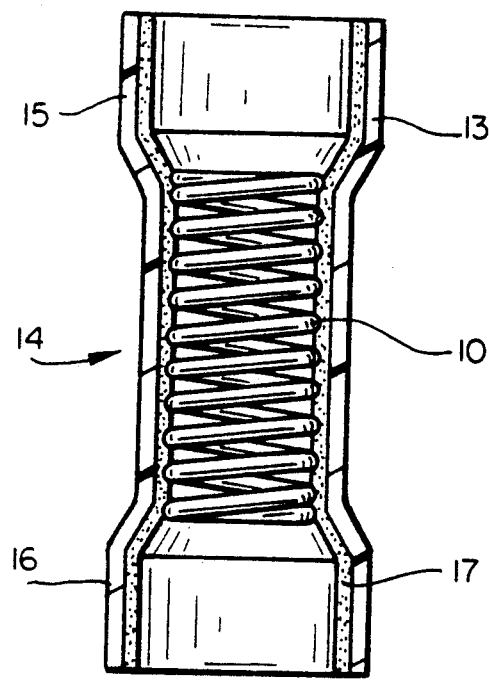
FIG_5
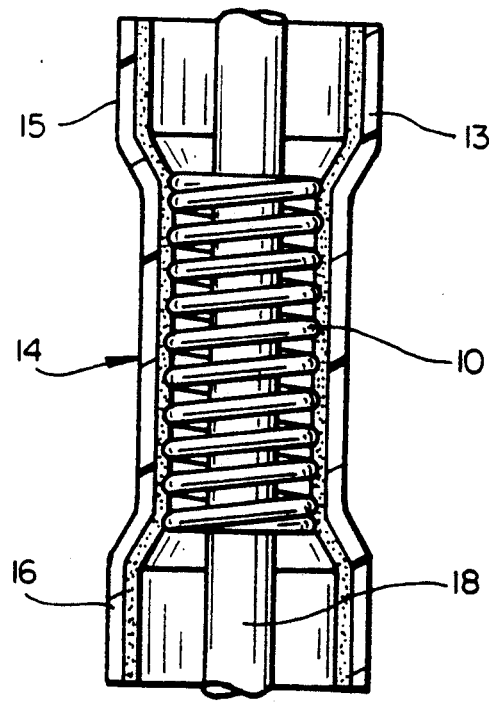
FIG_6

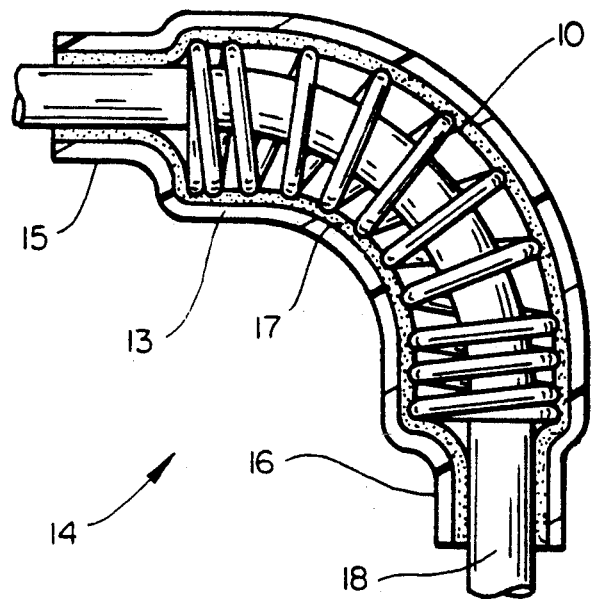
FIG_7
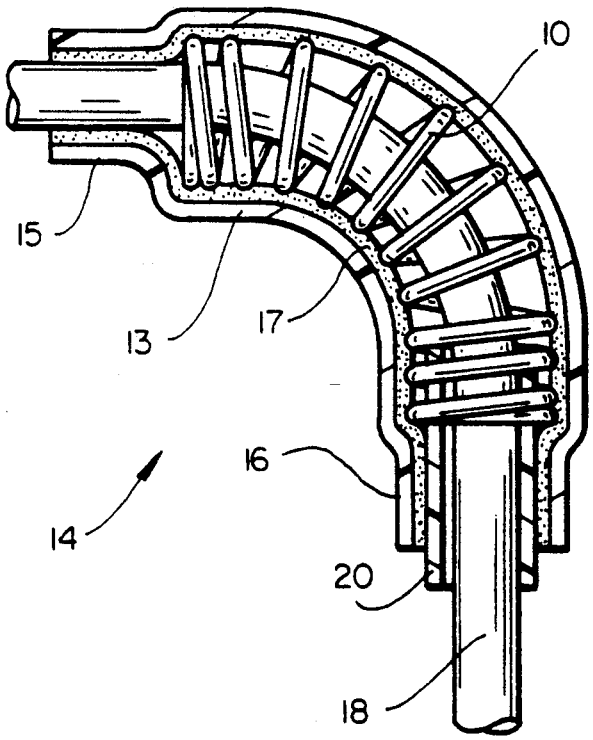
FIG_8

HEAT RECOVERABLE TUBULAR ARTICLE

BACKGROUND OF THE INVENTION

This invention relates to a heat recoverable tubular article which when heated recovers to or toward a specified angle with respect to the axis of the tube and to a method of preparing said article. It further relates to a method of bending an elongate substrate by positioning such a tubular article over the substrate and heating to cause recovery of the article thereby bending the substrate and to the resulting bent substrate.

Wiring and plumbing systems require wires or tubing to be bent at specific angles in specific locations relative to interconnection and "feed-through" points. Common methods of accommodating bends while providing mechanical, electrical, and environmental protection include elastomeric molded parts and heat-shrinkable molded parts.

Elastomeric parts require specialized tooling to fabricate and install, and they are difficult to incorporate in automatic assembly processes. When elastomeric parts are used a part of a connector or conduit assembly, they impart a "rubbery" feel to the connectors, making it difficult to assure the connectors are properly mated. Environmental sealing quality is limited with the "interference fit" method of displacing elastomeric parts. A substrate can be bent using elastomeric "elbow" parts by forcing the substrate through the part or by inserting a straight expandable tool into the part to straighten and enlarge it and then inserting the substrate. Removal of the tool causes the elastomeric elbow to return to its bent shape thus bending the substrate. Angles achieved with elastomeric bending devices are hard to control, as the substrates cause the elastomers to "spring back". Finally, the elastomeric parts are normally "slip fit" to connectors and conduits, and the quality of mechanical fit between the parts provides poor strain relief.

Some limitations of elastomeric molded parts can be overcome with heat-shrinkable molded parts, but heat-shrinkable molded parts also have limitations. A heat-shrinkable part is easier to install, but it is much more difficult to fabricate. In addition, a conventional heat-shrinkable molded part does not have enough force when it is shrinking to bend wire or tubing substrates.

My invention overcomes concerns associated with elastomeric parts while also addressing limitations of conventional heat-shrinkable molded parts.

SUMMARY OF THE INVENTION

One aspect of this invention comprises a heat recoverable tubular article comprising:
(a) a polymeric sleeve; and
(b) a spring having a first configuration in which it is bent at a given angle and a second configuration in which it is substantially straight, said spring being held in said second configuration by said sleeve;
wherein when heat is applied to the article, the polymeric material of the sleeve softens to permit recovery of the spring to its bent configuration thereby bending the sleeve.

Another aspect of this invention comprises a method of preparing a heat recoverable article which comprises:
(I) forming and setting a spring in a first configuration in which it is bent as a given angle;
(II) straightening the spring and maintaining the spring in its straightened configuration;
(III) positioning a polymeric sleeve with respect to the spring such that it retains the spring in its straightened configuration.

A further aspect of this invention comprises a method of forming a bend in an elongate substrate which comprises:
(I) positioning over the substrate a heat recoverable tubular article comprising:
(a) a polymeric sleeve; and
(b) a spring having a first configuration in which it is bent at a given angle and a second configuration in which it is substantially straight, said spring being held in said second configuration by said sleeve; and
(II) heating the article to cause the polymeric material of the sleeve to soften thereby permitting the spring to recover toward its bent configuration which causes the substrate to bend.

Yet another aspect of this invention comprises an elongate substrate in which a segment thereof has been bent by a heat recovered article comprising a polymeric sleeve and a spring, the spring having bent the substrate to the desired angle.

A still further embodiment of this invention comprises a heat recoverable tubular article comprising:
(a) a polymeric sleeve; and
(b) a spring having a first configuration in which it is heat stable and bent at a given angle and a second configuration in which it is heat unstable and substantially straight, said spring being in said second configuration until sufficient heat is applied to cause the spring to transform into its first configuration, thereby bending the sleeve.

BRIEF DESCRIPTION OF THE DRAWING

FIG. 1 illustrates a helical spring that contains a bend at a specified angle for use in preparing an article in accordance with this invention.

FIG. 2 shows the spring of FIG. 1 straightened during the preparation of an article of this invention.

FIG. 3 shows a heat recoverable polymeric sleeve positioned over the straightened spring of FIG. 2.

FIG. 4 shows the polymeric sleeve partially recovered over the straightened spring.

FIG. 5 shows a heat recoverable article of this invention.

FIG. 6 shows the heat recoverable article of FIG. 5 positioned over a substrate prior to heating the article.

FIG. 7 shows an article of this invention recovered over a substrate causing the substrate to bend at the desired angle.

FIG. 8 shows the use of an article of this invention to bend a bendable substrate and connect the bent substrate to a rigid conduit.

DETAILED DESCRIPTION OF THE INVENTION

The heat recoverable article of this invention comprises a polymeric sleeve and a spring. Recovery of the spring when heat is applied provides the desired degree of bending of the recovered article. In a preferred embodiment, the polymeric sleeve is made of a heat recoverable material and is itself recoverable, generally radially shrinkable to a smaller diameter when heated. Such dimensionally heat recoverable polymeric articles are well known.

A dimensionally recoverable article is one whose dimensional configuration may be made to change when subjected to an appropriate treatment. Usually these articles recover, on heating, towards an original shape from which they have previously been deformed, but the term "heat-recoverable" as used herein also includes an article which, on heating, adopts a new configuration even if it has not been previously deformed.

In their most common form heat-recoverable articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded immediately after extrusion, while hot, to a dimensionally heat-unstable form. In other embodiments a preformed dimensionally heat-stable article is deformed to a dimensionally heat-unstable form in a separate stage.

In the production of heat recoverable articles, the polymeric material may be crosslinked at any stage in the production of the article to enhance the desired dimensional recoverability. One manner of producing a heat-recoverable article comprises shaping the polymeric article into the desired heat-unstable form, subsequently crosslinking the polymeric material, heating the article to a temperature above the crystalline melting point of the polymer, deforming the article and then cooling the article while in the deformed state so that the deformed state of the article is retained. In use, since the deformed state of the article is heat-unstable, application of heat will cause the article to assume its original heat-stable shape.

It is to be understood that while the use of a recoverable polymeric tubular article is preferred, a polymeric sleeve made of heat stable material may be used. The polymer used in making the sleeve preferable softens, i.e. undergoes a modulus change to a lower modulus, on heating. The polymeric sleeve is preferably of polyethylene, polyvinylidene fluoride, nylon, or the like. The sleeve may be closed at one end forming a cap, if desired.

The article of this invention also comprises a spring. Generally the spring is positioned within the polymeric sleeve, but it may be positioned around the outside of the sleeve, or even embedded within the polymeric wall of the sleeve.

The spring can be made of any resilient material, for example, a polymeric material, such as a high performance polymer, for example a polyaryl ether ketone, or more preferably of a metal, such as spring steel or the like. The spring may be made of a shape memory alloy, such a nickel titanium alloy, if desired. The use of a spring made of a shape memory alloy provides a higher recovery force, thereby permitting the bending of stronger substrates.

Shape memory alloys are well known and can exhibit thermal shape memory and/or pseudoelastic shape memory. U.S. Pat. No. 4,935,068 to Duerig, which is commonly assigned with the present application and incorporated herein by reference, teaches the fundamental principles of shape memory alloys. Some alloys which are capable of transforming between martensitic and austenitic phases are able to exhibit a shape memory effect. The transformation between phases may be caused by a change in temperature and if it is the phenomenon is known a thermal shape memory. For example, a shape memory alloy in the martensitic phase will begin to transform to the austenitic phase when its temperature rises above $A_s$ and the transformation will be complete when the temperature rises above $A_f$. The forward transformation will begin when the temperature drops below $M_s$ and will be complete when the temperature drops below $M_f$. The temperatures $M_s$, $M_f$, $A_s$, and $A_f$ define the thermal transformation hysteresis loop of the shape memory alloy.

Under certain conditions, shape memory alloys exhibit pseudoelasticity, which does not rely on temperature change in order to accomplish shape change. A pseudoelastic alloy is capable of being elastically deformed far beyond the elastic limits of conventional metals.

The property of pseudoelasticity of certain shape memory alloys, which preferably is used in the devices of this invention, is the subject of a paper entitled "An Engineer's Perspective of Pseudoelasticity", by T. W. Duerig and R. Zadno, published in Engineering Aspects of Shape Memory Alloys, page 380, T. W. Duerig, K. Melton, D. Stoeckel, and M. Wayman, editors, Butterworth Publishers, 1990 (proceedings of a conference entitled "Engineering Aspects of Shape Memory Alloys", held in Lansing, Mich. in August 1988). As discussed in the paper, the disclosure of which is incorporated herein by reference, certain alloys are capable of exhibiting pseudoelasticity of two types.

"Superelasticity" arises in appropriately treated alloys while they are in their austenitic phase at a temperature which is greater than $A_s$ and less than $M_d$ ($A_s$ is the temperature at which, when a shape memory alloy in its martensitic phase is heated, the transformation to the austenitic phase begins, and $M_d$ is the maximum temperature at which the transformation to the martensitic phase can be induced by the application of stress). Superelasticity can be achieved when the alloy is annealed at a temperature which is less than the temperature at which the alloy is fully recrystallized. Alternative methods of creating superelasticity in shape memory alloys, such as solution treating and aging, or alloying, are also discussed in "An Engineer's Perspective of Pseudoelasticity", referenced above. An article may be provided with a desired configuration by holding it in that configuration during annealing, or during solution treatment and aging. An article formed from an alloy which exhibits superelasticity can be deformed substantially reversibly by 11% or more. In contrast, "linear pseudoelasticity", is believed not to be accompanied by a phase change. It is exhibited by shape memory alloys which have been cold worked or irradiated to stabilize the martensite, but have not been annealed in the manner discussed above. An article formed from an alloy which exhibits linear pseudoelasticity can be deformed substantially reversibly by 4% or more. The treatment of shape memory alloys to enhance their pseudoelastic properties is also discussed in above-mentioned U.S. Pat. No. 4,935,068 to Duerig, incorporated herein by reference.

In embodiments of this invention in which the spring is made of a shape memory alloy, the alloy may exhibit thermal shape memory, or either linear pseudoelasticity or superelasticity (which is sometimes referred to as non-linear pseudoelasticity), or pseudoelasticity of an intermediate type.

If the spring is made of a thermal shape memory alloy, the polymeric sleeve does not retain the spring in its straightened shape. It will remain in the straightened configuration until heat is applied. When heat is applied, the alloy will undergo a the above discussed transformation to the austenitic phase which will cause the spring to return to its bent shape. Bending of the spring will cause the polymeric sleeve to bend as well as the substrate. As a result of this the properties of the polymeric sleeve are different for articles of this embodiment of the invention. If the spring is made of a pseudoelastic shape memory alloy, the polymeric sleeve must be strong enough to hold the spring in its straightened configuration. Heating of the article will cause the polymeric sleeve to soften sufficiently for the spring to return to its bent configuration.

The spring is preferable a coiled spring, but the use of a leaf spring is also contemplated. If the spring is a leaf spring, the spring may be made of the materials specified above, but is preferably of bimetallic strips or a thermal shape memory alloy to provide sufficient force to bend the polymeric sleeve and the substrate.

The spring of the heat recoverable article should be selected to have sufficient strength to cause the substrate to bend as desired. It is then necessary to select a polymeric sleeve which is capable of retaining the spring in a straightened configuration. This permits the article to be positioned over the substrate while it is a relatively straight shape. Upon application of heat, the polymeric sleeve softens sufficiently to permit the spring to return to its bent shape. This causes the sleeve and the substrate to bend also. Selection of appropriate combinations of spring and sleeve is well within the skill of the art having the teaching of this application before them.

The polymeric sleeve should be selected based on its required interaction with the spring. If the polymeric sleeve is to hold the spring in its straightened configuration, the walls of the sleeve must have sufficient strength to accomplish this. The walls of the sleeve may be relatively thin and made of a relatively strong, stiff material or the walls may be thicker and made of a less strong material.

In embodiments in which a coil spring is positioned with the polymeric sleeve, the provision of an inner layer of fusible material, preferably a thermoplastic material, which is solid at ambient (room) temperature. The solid thermoplastic material aids in holding the spring in its bent configuration. In embodiments of the invention in which the sleeve is radially heat recoverable and is applied by partially shrinking the sleeve into contact with the spring (see discussion below for more detail), the fusible material should be selected to have a melting point such that on recovery of the sleeve over the spring the fusible material with at least soften to permit the spring penetrate into the fusible material. When the article is then cooled the fusible material solidifies between the coils of the spring aiding in maintaining the spring in its straightened configuration. The fusible material can be, for example, the same polymer as the sleeve, such as uncrossed polyethylene in a crosslinked polyethylene sleeve, or a hot melt adhesive, such as an EVA (ethylene vinyl acetate copolymer) based hot melt adhesive or a polyamide based hot melt adhesive.

The article can be prepared as illustrated in FIGS. 1 through 5. In FIG. 1, spring 10 is bent at a desired predetermined angle. The angle of the spring depends on the proposed use of the article. Generally the angle of the spring is about 5° to about 150°, preferably about 20° to about 120° and most preferable about 45° to about 100°. The spring is set to maintain that angle, for example, by heat treatment. The spring may be provided with more than one bend, for example it may have an "S" configuration or a serpentine configuration.

The next step in the preparation of an article of this invention is to straighten spring 10, for example by placing it on a relatively straight mandrel 12, as shown in FIG. 2. A polymeric sleeve is then positioned over spring 10 as shown in FIG. 3. In the illustrated embodiment this is accomplished, as shown in FIG. 4, by partially shrinking a heat shrinkable sleeve 13 into contact with the spring to form heat recoverable article. The ends 15 and 16 or the heat shrinkable sleeve remain unrecovered. Also in the illustrated embodiment, the heat shrinkable sleeve is lined with an fusible material 17, which softens and preferable melts and flows when sufficient heat is applied to cause recovery of the spring and/or polymeric sleeve. The resulting heat recoverable article 14 comprising spring 10 and sleeve 13 is shown in FIG. 5.

As shown in FIG. 6, the article 14 is positioned over a substrate 18. The article is then heated such that the polymeric sleeve 13 softens permitting the spring 10 to recover, which bends the polymeric sleeve 13 and the substrate 18 as shown in FIG. 7. The ends 15 and 16 of the polymeric sleeve 13 shrink into contact with the substrate and the fusible material 17 adheres the tube to the substrate.

The fusible material preferably lines the entire length of tube 13. The fusible is preferably a polymeric material which softens and preferably melts and flows when heated to a temperature at which the spring and, optionally the polymeric sleeve recover. The fusible material preferable comprises a material which bonds to the substrate. For example the fusible material can be a hot melt adhesive which when at low temperatures (for example ambient or room temperature) is solid. As discussed above this solid layer of material helps to retain spring 10 in its straightened position. When heat is applied the fusible material melts and flows thus releasing the spring and permitting it to recover. Further, the fusible material, when hot, does not interfere with the recovery (shrinkage) of the polymeric sleeve 13.

As shown in FIG. 8, the substrate may include a rigid member 20, for example a rigid conduit, as well as bendable substrate 18. On heating of article 14, spring 10 recovers to bend substrate 18 and heat shrinkable tube 13 shrinks into contact with conduit 20 and substrate 18 forming a connection between the conduit and the substrate.

Substrates which can be bent using the article of this invention include, for example, wires, cables, pipes, and the like. As discussed above, the heat recoverable article may be provided with an inner layer of a fusible material which may be a hot melt adhesive. When the material is an adhesive, the adhesive also function to bond the polymeric sleeve to the substrate. A variety of adhesives and sealants can be used to bond or seal the sleeve to the substrate, including adhesives and sealants which do not melt and flow on application of heat. Sealants other that fusible adhesives may be used include, for example, mastics, sealants, greases and gels.

A preferred sealant is a gel. The gel preferably has a Voland Hardness of about 1 to about 525 g., more preferably about 5 to about 300 g, and most preferably about 5 to about 100 g., and also preferably has an ultimate elongation of at least about 50%, preferably at least about 100%. The elongation is measured according to the procedures of ASTM D217. The Voland hardness is measured using a Voland-Stevens Texture analyser Model LFRA having a 1000 g load cell, a 5 gram trigger, and a ¼ inch (6.35 mm) ball probe. For measuring the hardness of a gel a 20 ml glass scintillating vial containing 10 grams of gel is placed in the Voland-Stevens Texture analyser and the stainless steel ball probe is forced into the gel at a speed of 2.0 mm a second to a penetration distance of 4.0 mm. The Voland Hardness value of the gel is the force in grams required to force the ball probe at that speed to penetrate or deform the surface of the gel the specified 4.0 mm. The Voland Hardness of a gel may be directly correlated to the ASTM D217 cone penetration hardness and the procedure and a correlation is shown in FIG. 3 of U.S. Pat. No. 4,852,646 to Dittmer et al, the disclosure of which is incorporated herein by reference.

The gel is preferably a liquid-extended polymer composition. The polymeric component can be for example, a silicone, polyorgano siloxane, polyurethane, polyurea, styrene-butadiene and/or styrene-isoprene block co-polymers. The gels may be formed from a mixture of such polymers. Examples of gels can be found in U.S. Pat. Nos. 4,600,261 to Debbaut, 4,716,183 to Gamarra et al, 4,777,063 to Dubrow et al 4,864,725 to Debbaut et al, and 4,865,905 to Debbaut et al. European published patent application No. 204,427 to Dubrow et al and International published patent applications Nos. 86/01634 to Toy et al, and WO 88/00603 to Francis et al and commonly assigned copending U.S. applications Ser. Nos. 317,703 filed Mar. 1, 1990 to Dubrow et al and 485,686 filed Feb. 27, 1990 to Rinde et al. The entire disclosures of the above are incorporated by reference herein for all purposes.

While the invention has been described herein in accordance with certain preferred embodiments thereof, many modifications and changes will be apparent to those skilled in the art. Accordingly, it is intended: by the appended claims to cover all such modifications and changes as fall within the true spirit and scope of the invention.

What is claimed is:

1. A heat recoverable tubular article comprising:
   (a) a polymeric sleeve; and
   (b) a spring having a first configuration in which it is bent at a given angle and a second configuration in which it is substantially straight, said spring being held in said second configuration by said sleeve; wherein when heat is applied to the article, the polymeric material of the sleeve softens to permit recovery of the spring, said spring having sufficient recovery strength to cause the polymeric sleeve to bend to a desired configuration.

2. An article according to claim 1, wherein the sleeve is lined with a thermoplastic material in which the spring is embedded.

3. An article according to claim 2, wherein the thermoplastic material is a hot melt adhesive.

4. An article according to claim 1 wherein the sleeve is made of a heat recoverable polymeric material and shrinks radially when heated.

5. An article according to claim 1, wherein the spring is a helical spring.

6. An article according to claim 1 wherein the spring is made of a metal.

7. An article according to claim 6 wherein the spring is made of spring steel.

8. An article according to claim 6 wherein the spring is made of a nickel titanium shape memory alloy.

9. A heat recoverable tubular article comprising:
   (a) a polymeric sleeve; and
   (b) a spring having a first configuration in which it is heat stable and bent at a given angle and a second configuration in which it is heat unstable and substantially straight, said spring being in said second configuration until sufficient heat is applied to cause the spring to transform into its first configuration, said spring having a sufficient recovery strength to cause the polymeric sleeve to bend to a desired configuration.

10. A heat recoverable article in accordance with claim 9 wherein the spring is made of a thermal shape memory alloy.

11. A heat recoverable article in accordance with claim 10, wherein the spring is made of a nickel-titanium alloy.

12. An article according to claim 1 wherein the bent configuration of the sleeve is at an angle of between about 20° to about 120°.

13. An article according to claim 12 wherein the angle is between about 45° to about 100°.

14. An elongate substrate in which a segment thereof is bent by a heat recovered article comprising a polymeric sleeve and a spring, wherein when subjected to heat, said spring having sufficient recovery strength to have bent the substrate to the desired angle.

15. An elongated substrate in which a segment thereof is to be bent by a heat recoverable article comprising a polymeric sleeve and a spring, wherein when heat is applied to the article, said spring having sufficient recovery strength to cause the substrate to bend to the desired angle.

* * * * *